Oct. 31, 1967  W. C. BURGESS, JR  3,349,891
APPARATUS FOR ORIENTING ARTICLES
Filed March 16, 1966  2 Sheets-Sheet 1

INVENTOR
WARREN C. BURGESS, JR.

BY Kramer & Sturges

ATTORNEYS

Oct. 31, 1967    W. C. BURGESS, JR    3,349,891
APPARATUS FOR ORIENTING ARTICLES
Filed March 16, 1966                            2 Sheets-Sheet 2

INVENTOR
WARREN C. BURGESS, JR.

BY Kramer & Sturgis

ATTORNEYS

United States Patent Office 3,349,891
Patented Oct. 31, 1967

3,349,891
APPARATUS FOR ORIENTING ARTICLES
Warren C. Burgess, Jr., 27018 Kennedy Ridge Road,
North Olmsted, Ohio 44070
Filed Mar. 16, 1966, Ser. No. 534,769
4 Claims. (Cl. 198—33)

ABSTRACT OF THE DISCLOSURE

This invention relates to automatically and rapidly orienting parts by launching them into free trajectory across a gap. The parts are accepted or rejected intermediate the extremities of the gap by testing their position in trajectory relative to a predetermined part position at a point along a free trajectory. Thus, parts are either accepted or rejected prior to their recapture.

---

The handling of parts by automatic means, which is included in what is known as "automation," has been growing rapidly in recent years. In most instances, the parts, or subassemblies of parts are stored in bulk, the individual parts or sub-assemblies being randomly disposed therein, e.g. in a supply hopper. Before such parts can be used in automatic machinery adapted for further assembly of such parts, they must be supplied in an oriented manner. Numerous devices have been perfected for orienting parts, or sub-assemblies of parts, including, for example, vibratory bowl type feeders characterized by a spiral trackway around the periphery of the bowl as described for example, in Patent No. 2,985,280, dated May 23, 1961. The parts exit from the bowl in oriented fashion, misaligned parts, or misoriented parts, being automatically returned to the bowl for repassage up the inclined trackway. From the bowl, the parts usually enter a transfer trackway which is adapted to hold the parts in oriented, aligned or predetermined ordered condition. The latter trackway may or may not be vibrated to aid in continuous feeding of the parts to the point of usage. Occasionally, situations arise where a line of parts due to either continuous feeding coupled with jamming at the head of the line results in buckling of the line, spilling of parts from the trackway and interruption of the feeding operation.

An important advantage of this invention is that it is a simpler means of achieving complete orientation of parts which heretofore has been virtually impossible by conventional means. An ordinary doubly reversely bent drapery hook, one leg of which is sharpened to a point, is a good example of such a part. Attempts have been made for years to orient this part automatically and rapidly so that a predetermined number may be counted out for packaging. Prior devices have at best oriented these parts in single file only. With overlapping and interlocking of parts, the supply of parts was not practical for purposes of counting or even assembly onto cards, for example.

Using the trajectory means of this invention, these parts may be fed out in the bulk onto a stationary rail inclined at an angle so that the parts will swing down if the rail passes between the two sides and then accelerate to achieve the speed necessary prior to being launched across an air gap. The parts are splashed in a bulk manner across the rail. Some catch on the rail and some slide down. Some fall to either side and are returned to the bowl feeder. Many of those that catch on the rail and slide down are misoriented or interlocked with other parts. As these misoriented or interlocked parts are launched across the gap, they are deflected to the side or down and returned to the bowl. Only the properly oriented parts are picked up on the end of the gap and directed out to a stacking or counting device.

A further important feature of the trajectory tooling as an extension over well known types of tooling is in providing an air gap and a recapture means in such a way that the feeding device which achieves the primary or first part of the orientation may operate continuously or "under back pressure" when the trajectory tooling of the present invention is employed. In other words, when the recapturing means is entirely filled with parts, parts having the proper trajectory and the proper orientation in that trajectory will strike the part uppermost in the recapturing means and be deflected to one side or down without causing any jamming action. In a bowl feeder, where the part is merely allowed to fall roward across a trip and feed out on a track, if the supply of rivets is blocked at the exit of the track, a pile-up of parts will result in the area wherein the part must be allowed to fall freely. This will result in misoriented parts being carried across this area and out the exit of the bowl. Malfunctions of any automatic process depending upon a supply of properly oriented parts will, of course, result. The use of trajectory tooling also tends to speed up the orientation process immeasurably as well as eliminate the necessity for complicating the control systems.

The present invention provides a novel process for recapturing oriented parts from flight through an air gap or, as referred to herein, while in a predetermined trajectory. Basically, the invention contemplates launching or catapulting parts into a gap, and while in flight performing a selecting operation such that those parts which move in the predetermined trajectory are in a position to be recaptured and fed where desired, and those which do not move in the predetermined trajectory are rejected and recycled. It will be noted that launching of parts may be carried on in a continuous manner whether or not recapturing of the oriented parts is taking place; i.e. the invention contemplates the situation where the recapturing means is unable to accept additional oriented parts because it is filled. Under such condition both misoriented and oriented parts will be returned to the bulk supply without causing feeding out of the recapturing means of misaligned or misoriented parts and without jamming the apparatus.

This invention will be illustrated in conjunction with a novel apparatus embodying the principles of the invention wherein parts are launched into an air gap, a portion are deflected by suitable tooling means, and those parts having the proper orientation recaptured in oriented fashion. The principle is embodied in an apparatus including an inclined rotated drum into which a supply of rivets or tire studs are disposed. By rotating the drum on an inclined axis, the rivets are cascaded over a supply trackway, the shank portion falling between the tracks and the tracks intercepting and supporting the rivet by the head. These parts move by gravity or by other means (e.g. centrifugal means) to a discharge extremity where the individual parts are sequentially launched into an air gap. A preferred method for launching parts across the gap is that of accelerating the parts as they slide down along a fixed rail or track. If the parts are properly sized and aligned when launched, they will move in a predeterminded trajectory and path which is, for example, stroboscopically observable as a plurality of positions through which the parts will move across the gap. Any part which is of improper size, or improperly aligned on the launching trackway or tooling device will follow a trajectory profile which is either different from the desired trajectory or while having the same trajectory profile, follows a different path. By arranging the recapturing means to accept only those which follow the desired predetermined trajectory, the balance are selectively discarded or rejected and returned to the bulk supply. In this specification, the term "trajectory" contemplates both path and profile each of which must be met before recapturing is possible. Alternatively, the parts moving in said predetermined trajectory across the air gap, may be intercepted or deflected by any suitable means, e.g. a deflector, a trip, and air jet, etc. and their spatial disposition changed to a predetermined re-oriented position in which the part is recaptured. For example, the studs may be tripped and rotated 90° so that they fall head first into a hollow tube. Alternatively, the location of the recapturing means may be such that the parts in proper trajectory are rotated 90° in the process of recapture.

Briefly stated then, the present invention is in a process for orienting articles and comprises the steps of, launching the articles into a free trajectory across a gap deflecting a portion of the articles moving in said gap comprising those which are misoriented at launch and recapturing only the properly oriented articles. One form of apparatus which embodies this invention, includes means for launching the articles into a free trajectory across a gap, means for deflecting articles moving in said gap, and means for recapturing the properly oriented articles.

The invention will be better understood by having reference to the annexed drawing illustrating a preferred embodiment of an apparatus incorporating the principles of the present invention, and wherein.

Figure 1:
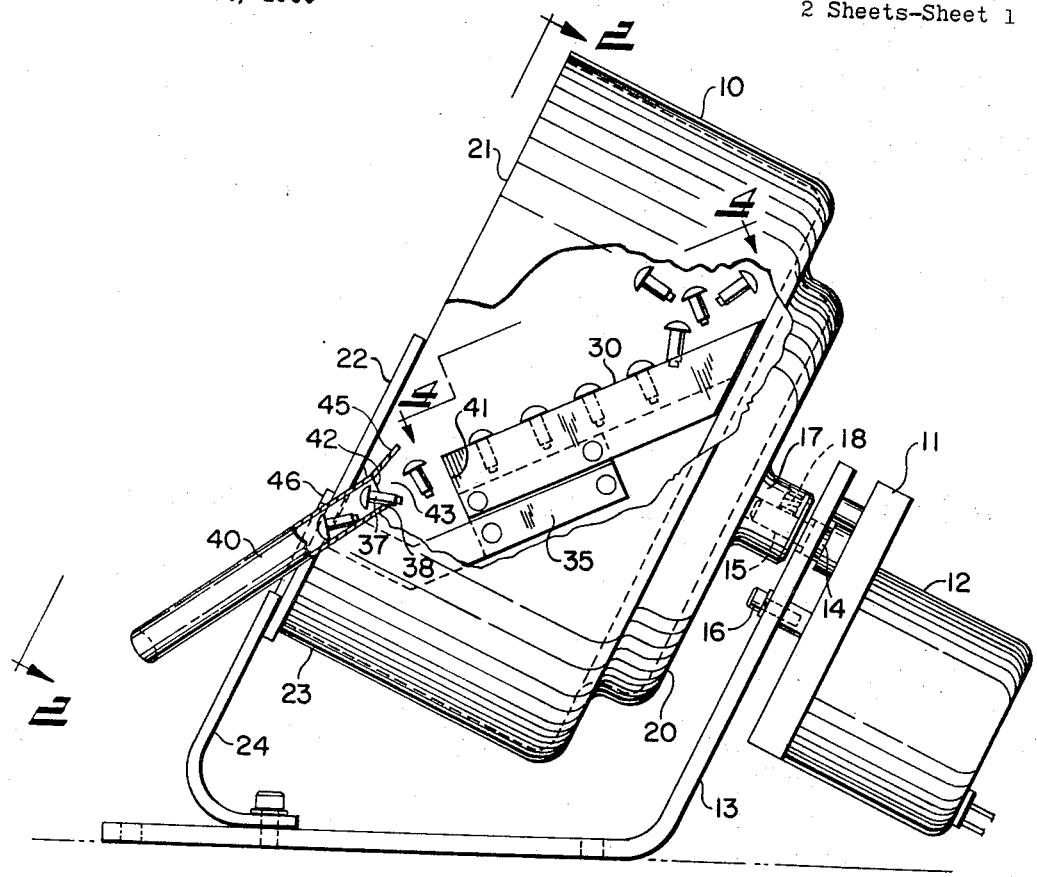
FIG. 1 is a side elevation of an inclined rotating supply drum including tooling for capturing and launching parts into a trajectory, deflecting means and recapturing means.

Referring now to FIG. 1 there is here shown an inclined rotating supply drum 10 mounted for rotation about an inclined axis which in the particular case illustrated is inclined at an angle of 25° to the horizontal. Gear reducer 11 coacts between drive motor 12 and bracket 13 into which bushing 14 carrying shaft 15 is fitted. The assembly is secured to bracket 13 by any suitable fastening means such as bolt 16. Collar 17 secured to the bottom of rotating drum 10 is bored to receive shaft 15 and is provided with suitable interlocking means for connecting shaft 15 to collar 17 such as set screw 18. Thus when motor 12 is actuated, the rotating drum 10 is revolved about the inclined axis. The bottom portion 20 of the rotating drum is closed so as to prevent the escape of parts therethrough (although it may be perforated to permit the escape of washing fluid when washing or degreasing parts). The drum 10 is open at its upper end to permit introduction of parts to the drum. In order to retain a suitable supply of parts within the drum there is provided a stationary dam 22 which in the embodiment illustrated in the drawing is a semi-circular plate held in close but spaced relation from the lower portion 23 of rotating drum 10 by any suitable means such as bracket 24.

The purpose of plate 22 is to maintain a suitable supply of rivets or tire studs, for example, in the bowl, and to prevent accidental discharge of rejected parts therefrom. Rotating drum 10 may, if desired, be provided with suitable radial flights to aid in lifting the bulk rivets or studs and cascading them over the inwardly projecting tooling.

Figure 4:
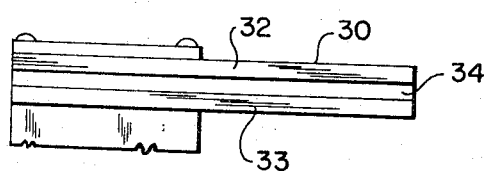
FIG. 4 is a top view of a launching rail.
Figure 2:
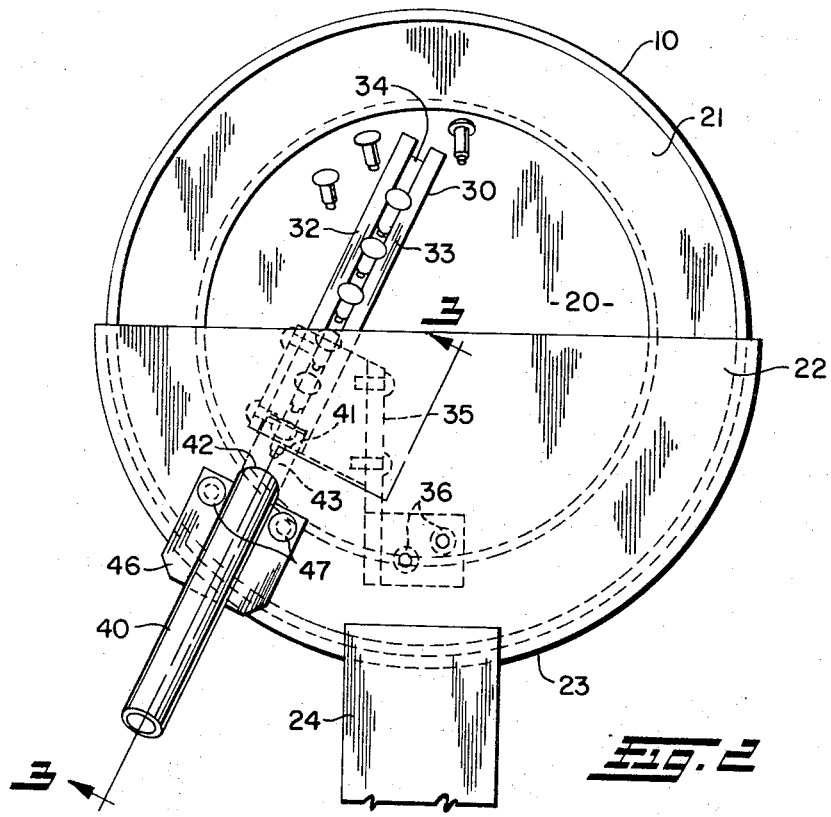
FIG. 2 is a front elevation of the apparatus shown in FIG. 1 partially cut away to eliminate unnecessary parts.
Figure 3:
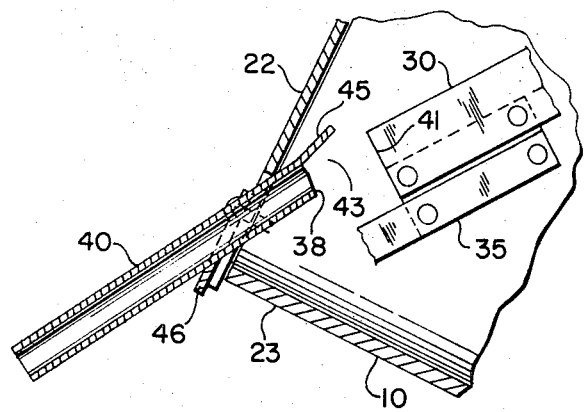
FIG. 3 is a fragmentary cross-sectional view of the launching device, the deflecting device and the recapturing device as it appears in the plane indicated by the line 3—3 in FIG. 2.

As shown in FIG. 1 and in greater detail in FIG. 3 rail 30 is disposed within inclined rotating drum 10 and so positioned as to intercept bulk rivets cascading thereover by reason of the rotation of drum 10. Rail 30 as best shown in FIG. 4 is a simple channel having a pair of parallel spaced rails 32 and 33 so disposed as to receive studs from the bulk supply as they are cascaded over the rail 30 and to support the bulk of them on the rails 32 and 33 while the shank and tail portions extend into the groove 34. Any suitable support such as support 35 may be used to position the launching rail 30 in the rotating drum 10. The supporting means 35 may be fastened to the cover plate 22 by any suitable means such as bolts 36 as shown in FIG. 2. The launching rail is stationary relative to the rotating drum 10. The location of rail 30 will depend, of course, upon the type of part being captured for launching. It is convenient to dispose the launching rail 30 so that the parts, e.g. the rivets, slide downwardly by gravity with the shank portions disposed between the rails in the groove 34. The spacing of the rails 32 and 33 defining the groove 34 may be such as to afford a preliminary selection of parts from the bulk supply by selecting only those which have a proper shank diameter to fit conveniently between the rails and allow sliding motion therealong. Over-sized parts, or parts which come to rest crosswise of the rails will be rejected. The angle of disposition of the capturing launching rails in the embodiment shown should be greater than the friction angle of the rivets on the rail so as to permit sliding in response to gravitational force. Motion along the rail while preferably and conveniently due to gravity may be imparted by vibratory means, if desired.

Extending through the cover plate 22 is a recapturing tube 40 so positioned and disposed in relation to the end 41 of launching rail 30 as to be in a position to selectively receive the rivets or studs in predetermined oriented position. In the embodiment illustrated, it is desired that the rivets or studs be fed head first into the tube 40. The internal dimension of tube 40 is such as to permit the rivets or studs to slide freely therethrough in head-to-tail relationship but insufficient to permit tumbling of the studs resulting in head-to-head or tail-to-tail disposition therein. The mouth, or receiving aperture 42 of the recapturing tube 40 is spaced from the launching extremity 41 of launching rail 30 to provide an air gap 43 therebetween. The rivets slide down the launching rail 30 and are catapulted or launched across the gap 43 towards the mouth 42 of the recapturing tube 40. The properly positioned and launched rivets follow a predetermined trajectory. The improperly positioned and launched rivets will not follow this trajectory and will not, therefore, be accepted by the recapturing tube.

The rivets moving in the predetermined trajectory are angularly disposed to the longitudinal axis of the recapturing tube 40, and are intercepted or deflected in flight as their shank portions 37 strike the lower lip or edge 38 of the recapturing tube's mouth 42. The rivets are struck in respect to their center of inertia, such that they are flipped or rotated about 90°, and enter the mouth 42 of the recapturing tube 40, head first. Only properly launched and re-oriented rivets are recaptured, i.e. rivets moving in, and deflected from the predetermined trajectory. The rivets moving in other free trajectories and not properly oriented, are deflected back into the storage portion 23 of the drum 10.

Any suitable means, e.g. a deflector shield 45, can be provided for deflecting these improperly oriented rivets into the storage portion 23 of the drum 10 for recycling to the launching rails. The deflector 45 also prevents rivets from entering the mouth 42 of the recapturing tube 40 in a misoriented fashion.

In the embodiment shown, the air gap between the launch rail extremity 41 and the tube mouth 42 is about 0.5 inch long. The deflector 45 extends from the tube extremity or mouth 42 at an angle of about 10° to the path of rail 30, substantially as shown in FIG. 3. The axis of the recapturing tube 40 is disposed at an angle to the horizontal which is about 5° greater than the angle of disposition of the launching rails 30.

Rivets which travel down the launching rails too slowly will follow a different trajectory and be rejected by the system. Rivets which land with the stud portions extending upwardly will slide down the rail 30 and have the free end of the deflector 45 intercept the same and cause it to be rejected to one side or other depending on the impact. If the tube 40 is filled, all of the parts subsequently launched will be rejected and fall through the air gap 43. Rejected rivets are returned to the bulk supply of rivets for recycling through the system.

As shown in FIG. 2, the recapturing tube 40 is desirably disposed in a quadrant as shown in the illustration. The projected axis of tube 40 intercepts the vertical axis 1—1 of FIG. 2 at an angle of about 25°. Tube 40 is welded to plate 46 which is secured to plate 22 by any suitable fastening means such as bolts 47.

In operation, then a supply of bulk rivets or studs is supplied to rotating drum 10 and the drive means 12 activated. As the drum rotates, the rivets are cascaded over rail 30 which selects a portion thereof and captures them in head up, shank down position. In this position, the rivets slide by gravity or other suitable force means to the launching end 41 where they are projected into a gap 43 along a predetermined trajectory. While in said predetermined trajectory, a portion of the part, e.g. the shank of the rivet is intercepted by the tube portion 37, and its spatial disposition altered to a desired predetermined position for recapture by the hollow recapturing tube 40. The articles then flow again by gravity or other suitable motivated force, e.g. vibratory means, in head-to-tail relation. As the parts escape from the delivery tube 40, they may be utilized in any assembly process such as, for example, a stud emplacing tool which sequentially and in timed relation to a tire, for example, forces the studs into stud receiving holes in the surface of the tire to produce a studded tire.

The embodiment of the invention illustrated in the drawing and described above, is one of many embodiments for carrying out the basic inventive concept of orienting parts by launching them into space and advantageously utilizing their movement in free trajectory for selecting the articles in a predetermined position for recapture, and rejecting those in any other position.

The basic concept of the invention contemplates recapturing only the properly oriented articles at a point spaced from the point of launching, all other articles being rejected and eventually returned to the launching site for relaunching.

Embodiments of the invention include, uniformly positioning at least some of the articles prior to launching such that when launched, the articles will follow a predetermined free trajectory, and recapturing only such articles. Other embodiments include means for deflecting articles in flight to a predetermined re-oriented position for recapture.

Any suitable means can be provided for rejecting improperly oriented parts. For example, fingers or deflectors, stencils, or the like, can be mounted along the trajectory, such that they will deflect articles not properly launched, not following the predetermined trajectory through which each properly launched article moves, or improperly oriented at the point of recapture. Also, the means for recapturing the articles can be designed to receive and carry away only properly oriented articles, thereby eliminating any need for other externally mounted means for deflecting the articles in flight.

What is claimed is:

1. An apparatus for disposing a plurality of similarly shaped articles in oriented relation comprising in combination:

(a) a rotatable supply drum disposed for rotation about an axis inclined to the horizontal;
(b) inclined rail means coacting inside said supply drum to intercept and convey parts from a random supply thereof carried in said drum when said drum is rotated about said inclined axis, said parts having at least one laterally extending means which suspends the article on said rail means;
(c) means disposed in spaced relation from said inclined rail means and defining an unconfined gap having launching and recapturing extremities, said means serving to recapture properly oriented articles at the recapturing extremity of said gap, said recapturing means including means to further orient the recaptured articles;
(d) said inclined rail means also serving to launch articles in free trajectory across said unconfined gap;
(e) said rail means also serving to orient at least some of the articles intercepted by said inclined rail means prior to reaching the launching extremity of said gap;
(f) means located intermediate and in spaced relation to the extremities of said gap for testing the position of articles in said free trajectory relative to a predetermined article position along the free trajectory through which properly oriented articles move and including means for deflecting articles not in said predetermined article position;
(g) said drum coacting with the article deflecting means to collect articles not accepted for recapture.

2. The apparatus of claim 1 wherein the recapturing means (c) includes an article receiving tube angularly disposed to the horizontal for carrying oriented articles away by gravity.

3. The apparatus of claim 1 which includes:

(h) means positioned adjacent the recapturing extremity of the gap for deflecting articles accepted for recapture to a reoriented position for recapture.

4. The apparatus of claim 3 wherein the deflecting means (h) includes a portion of the tube adjacent the recapturing extremity of the gap.

References Cited

UNITED STATES PATENTS

| 2,350,486 | 6/1944 | Bailey | 221—160 |
| 2,639,445 | 5/1953 | Fray | 198—33 |
| 3,127,000 | 3/1964 | Tack | 198—33 |
| 3,260,345 | 7/1966 | Barnes | 198—33 |
| 3,301,378 | 1/1967 | Wayne et al. | 198—33 |

OTHER REFERENCES

Machinery's Yellow Back Series No. 39, Hopper Feeds As an Aid to Automation, New York, The Machinery Pub. Co. Ltd., chapter 1, pp. 15–18, Oct. 31, 1957.

Philip Povic. Hopper Feeding, Automatic Machining Mag., August 1962, pp. 38–40.

EVON C. BLUNK, *Primary Examiner.*

R. J. HICKEY, *Assistant Examiner.*